June 5, 1962 P. L. FRANCIS 3,037,765
VACUUM SPRING ASSEMBLY
Filed Jan. 10, 1961
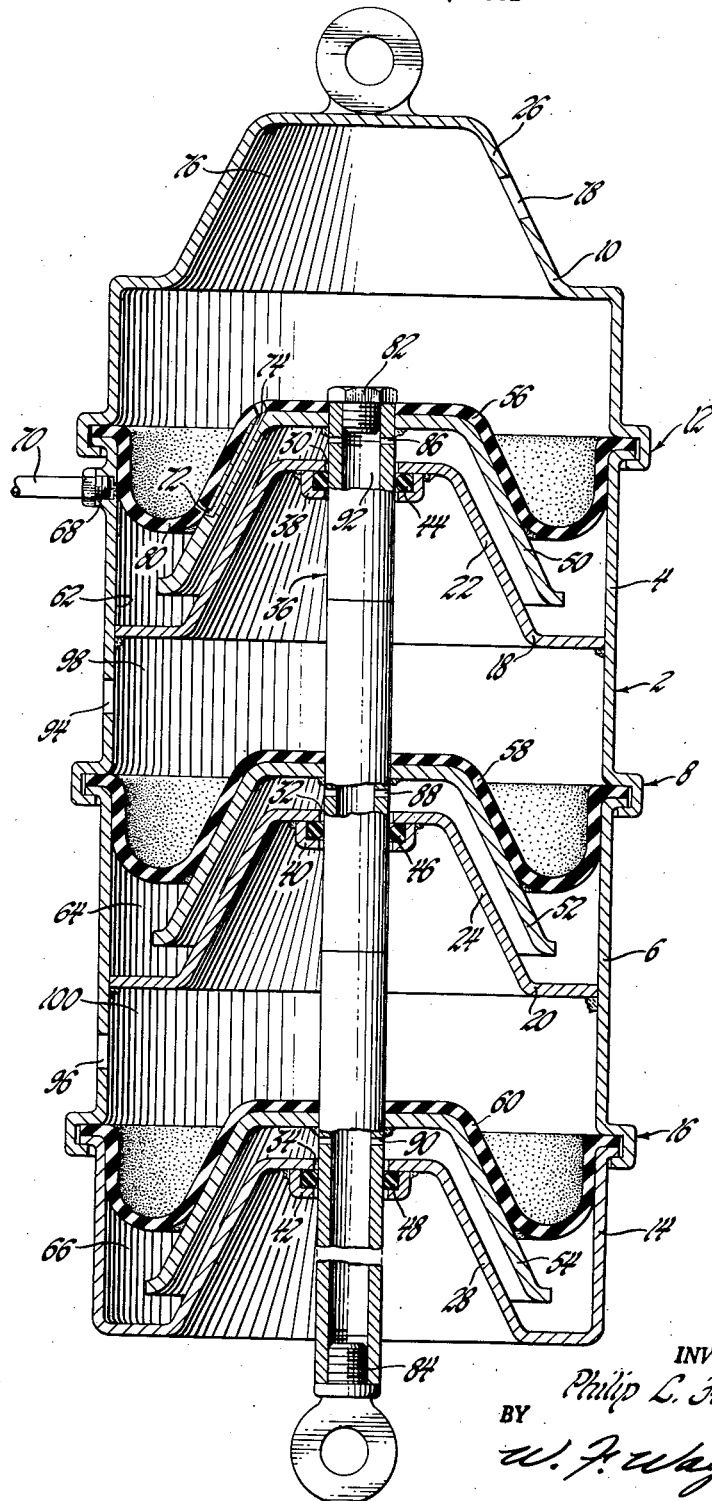
INVENTOR.
Philip L. Francis
BY
W. F. Wagner
ATTORNEY

United States Patent Office 3,037,765
Patented June 5, 1962

3,037,765
VACUUM SPRING ASSEMBLY
Philip L. Francis, Pontiac, Mich., assignor to General Motors Corporation, Detroit, Mich., a corporation of Delaware
Filed Jan. 10, 1961, Ser. No. 81,767
7 Claims. (Cl. 267—65)

This invention relates to springs and more particularly to variable rate springs of the type employing subatmospheric pressure as the elastic medium.

An object of the invention is to provide an improved spring.

Another object is to provide an improved vacuum actuated spring.

A further object is to provide a vacuum actuated spring having a relatively small diameter in relation to the load supporting capability thereof.

A still further object is to provide a device of the stated character utilizing a plurality of axially stacked pistons and diaphragms arranged within a common cylindrical housing.

Yet a further object is to provide a spring of the stated character wherein flow of subatmospheric pressure into and out of the spring is a direct function of relative displacement between one of the pistons and the cylinder.

These and other objects, advantages and features of the invention will become more fully apparent as reference is had to the accompanying specification and drawing illustrating a vacuum spring in accordance with the invention.

Although conventional vacuum actuated springs are capable of supporting very heavy loads, load supporting capability is a direct function of diameter, i.e., the greater the load the greater the diameter of spring required. However, in utilizing vacuum springs in, for example, vehicle suspension, available space does not permit utilization of a spring of sufficient diameter to handle the maximum possible load. In order to overcome this deficiency in accordance with the present invention, a plurality of vacuum springs are arranged in axial alignment so as to produce a compound spring having a total effective area which is relatively greater in relation to the actual diameter of the spring assembly. In the case of automotive suspension, the compound spring preferably has an overall diameter small enough that the entire assembly may be disposed concentrically within conventional suspension coil springs.

Referring now to the drawing, there is shown a compound vacuum actuated spring in which the reference numeral 2 designates a cylinder assembly. Cylinder assembly 2 is formed of axially abutting cylindrical members 4 and 6 which are connected together by an interlocking circumferential flange structure 8. At its upper end, cylindrical member 4 is connected to an axially abutting cap member 10 by an interlocking circumferential flange structure 12. Lower cylindrical member 6 in turn is connected to an axially abutting lower cap member 14 by interlocking circumferential flange structure 16.

Disposed vertically intermediately of cylindrical members 4 and 6 are bulkheads 18 and 20, the outer peripheries of which are secured to cylindrical members 4 and 6, as by welding. Bulkheads 18 and 20 are hat shaped in cross section and have tapered crowns 22 and 24 which correspond with the cross sectional configuration of the upwardly bulged portion 26 of cap member 10 and the upwardly bulged portion 28 of lower cap member 14. Formed centrally of bulkheads 18 and 20 and bulged portion 28 are axially aligned apertures 30, 32 and 34 through which extends a segmented hollow piston rod 36. Secured to the underside of bulkheads 18 and 20 and cap member 14 in concentric relation with apertures 30, 32 and 34 are annular flanges 38, 40 and 42 of C-shaped cross section. Disposed within flanges 38, 40 and 42 are O-ring seals 44, 46 and 48 which embrace piston rod 36. Attached, as by welding, to piston rod 36 at equally spaced intervals along its length are hat-shaped piston elements 50, 52 and 54, each of which is formed in cross section so as to permit nesting engagement with the bulkhead vertically therebelow. A plurality of thin flexible diaphragms 56, 58 and 60 overlie pistons 50, 52 and 54 and sealingly engage the cylinder assembly 2 to form axially spaced separated cavities 62, 64 and 66 which are subjected to varying degrees of subatmospheric pressure in a manner shortly to be described. As will be evident from the drawing, the outer peripheral edge of each diaphragm is connected in air-tight engagement with cylinder assembly 2 as coincidental function of the interlocking action of flanges 8, 12 and 16.

In accordance with the general features of the invention, regulation of subatmospheric pressure in cavity 62 is controlled by providing the port 68 in the wall of cylinder 4 which communicates via conduit 70 with a source of vacuum, not shown. A second port 72 extends radially inwardly partly through the tapered wall of piston 50 and communicates via internal drilled passage 74 with the cavity 76 formed between diaphragm 56 and cap member 10. Cap member 10 in turn has a relatively large aperture 78 formed therein which communicates with atmosphere. As will be evident from inspection of the drawing, when the piston 50 is in the vertical position shown, both ports 68 and 72 are closed by the overlapping action of the intermediate depending convolution 80 of diaphragm 56, therefore preventing increase or decrease in the subatmospheric pressure level in cavity 62. However, when piston 50 moves upwardly relative to cylinder 2 as a result of increased load on the spring assembly, diaphragm 56 peels away from port 68 and allows an increase in vacuum in cavity 62 until the relative displacement of piston 50 and cylinder 2 is restored to the position shown by the downward force of atmosphere acting on the top of piston 50 and diaphragm 56. Conversely, when the piston 50 descends below the level shown, port 72 is uncovered as diaphragm 56 peels off piston 50 allowing atmospheric air to bleed into cavity 62 through aperture 78 and drilled passage 74.

According to the principal feature of the invention, variation in subatmospheric pressure in cavity 62 is simultaneously imparted to cavities 64 and 66. In the embodiment shown, this is accomplished by closing the ends of hollow piston rod 36 with plugs 82 and 84 and forming radial ports 86, 88 and 90 in the wall of the rod which are vertically spaced respectively immediately below pistons 50, 52 and 54. It will be evident that ports 86, 88 and 90 cooperate with the hollow interior 92 of rod 36 to allow equalization of pressure between cavities 62, 64 and 66. Similarly, the wall of cylinder 4 is provided with a large port 94 located between bulkhead 18 and diaphragm 58, while the wall of cylinder 6 is provided with a large port 96 located between bulkhead 20 and diaphragm 60. Ports 94 and 96 communicate with atmosphere in the same manner as port 78 of cap 10 and hence cause atmospheric pressure to exist at all times in the chambers 76, 98 and 100 above diaphragms 50, 52 and 54, respectively.

From the foregoing it will be seen that a novel and improved vacuum spring has been provided. It is to be particularly noted that although a plurality of individual piston, diaphragm and cylinder assemblies are involved, it is only necessary to provide flow control with respect to one of the assemblies.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. A compound fluid spring comprising a closed cylinder having a plurality of axially spaced partitions fixed therein, a piston rod extending through said partitions for reciprocable movement in said cylinder, a plurality of pistons fixed to said rod at axially spaced intervals, a plurality of flexible diaphragms connected to said cylinder at axially spaced intervals and overlappingly engaging said pistons, said pistons having depending skirt portions spaced radially from said cylinder forming annular clearances, said diaphragms having radially intermediate depending convolutions extending into said clearances, said cylinder and one of said pistons having ports formed therein which coact with the adjacent depending convolution of one of said diaphragms to control fluid flow into and out of the portion of said spring between said one diaphragm and the partition immediately therebelow, and passage means formed in said piston rod acting to transmit fluid pressure in said last mentioned portion of said spring to the corresponding portions between the other diaphragms and the partitions immediately therebelow.

2. A compound fluid spring comprising an elongated segmented closed cylinder having a plurality of centrally apertured axially spaced partitions fixed therein, a piston rod extending through the apertures of said partitions for reciprocable movement in said cylinder, a plurality of pistons fixed to said rod at axially spaced intervals equal to the space between said partitions, a plurality of flexible diaphragms connected to said cylinder at axially spaced intervals and overlappingly engaging said pistons, said pistons having depending skirt portions spaced radially from said cylinder forming annular clearances, said diaphragms having radially intermediate depending convolutions extending into said clearances, said cylinder and one of said pistons having ports formed therein which coact with the adjacent depending convolution of one of said diaphragms to control fluid flow into and out of the portion of said spring between said one diaphragm and the partition immediately therebelow, and passage means formed in said piston rod acting to transmit fluid pressure in said last mentioned portion of said spring to the corresponding portions between the other diaphragms and the partitions immediately therebelow.

3. A compound fluid spring comprising a plurality of cylindrical segments connected together to form an elongated cylinder, each segment having a centrally apertured fixed partition therein, end caps fixed to the upper and lower segment, the lower cap having a central aperture aligned with the apertures in said partitions, a segmented piston rod extending through said apertures for reciprocable movement in said cylinder, a plurality of pistons fixed to said rod at axially spaced intervals equal to the spacing between said partitions and lower end cap, a plurality of flexible diaphragms connected to said cylinder at the segmented junctures and overlappingly engaging said pistons, said pistons having depending skirt portions spaced radially from said cylinder forming annular clearances, said diaphragms having radially intermediate depending convolutions extending into said clearances, said cylinder and one of said pistons having ports formed therein which coact with the adjacent depending convolution of one of said diaphragms to control fluid flow into and out of the portion of said spring between said one diaphragm and the partition immediately therebelow, and passage means formed in said piston rod acting to transmit fluid pressure in said last mentioned portion of said spring to the corresponding portions between the other diaphragms and the partitions immediately therebelow.

4. The structure set forth in claim 3 wherein said piston skirts are non-parallel with said cylinder wall.

5. The structure set forth in claim 3 wherein said piston skirts are frusto-conical in cross section.

6. The structure set forth in claim 3 wherein said partitions and end caps are crowned to a cross-sectional shape corresponding to the cross section of said pistons.

7. The structure set forth in claim 3 wherein said central aperture in said partitions and lower end cap are bounded by sliding seals embracing said piston rod.

References Cited in the file of this patent
UNITED STATES PATENTS

| | | |
|---|---|---|
| 1,840,178 | Transoue | Jan. 5, 1932 |
| 1,937,896 | Johnson | Dec. 5, 1933 |
| 2,393,942 | Taylor | Jan. 29, 1946 |
| 2,720,378 | Otto | Oct. 11, 1955 |